(12) United States Patent
Ho et al.

(10) Patent No.: US 11,953,751 B2
(45) Date of Patent: Apr. 9, 2024

(54) HOUSING STRUCTURE

(71) Applicant: Lite-On Technology Corporation, Taipei (TW)

(72) Inventors: Chiech-Wen Ho, Taipei (TW); Chi-Ting Lee, Taipei (TW); Chuan-Chih Hsiao, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 105 days.

(21) Appl. No.: 17/494,856

(22) Filed: Oct. 6, 2021

(65) Prior Publication Data

US 2022/0120994 A1 Apr. 21, 2022

Related U.S. Application Data

(60) Provisional application No. 63/092,515, filed on Oct. 16, 2020.

(30) Foreign Application Priority Data

Aug. 30, 2021 (CN) .......................... 202111006021.0

(51) Int. Cl.
*G02B 7/02* (2021.01)
*B60R 1/00* (2022.01)
(Continued)

(52) U.S. Cl.
CPC ................. *G02B 7/02* (2013.01); *F21V 15/01* (2013.01); *F21V 17/104* (2013.01); *B60R 1/00* (2013.01); *F21S 45/10* (2018.01)

(58) Field of Classification Search
CPC ......... G02B 7/02; F21V 15/01; F21V 17/104; F21V 19/004; F21V 19/0045; B60R 1/00; F21S 45/10
(Continued)

(56) References Cited

U.S. PATENT DOCUMENTS

| 4,460,947 A | * | 7/1984 | Kelly | ....................... F21V 17/16 |
| | | | | 362/311.06 |
| 4,862,334 A | * | 8/1989 | Ivey | ....................... F21V 17/164 |
| | | | | 362/310 |
| 5,032,956 A | * | 7/1991 | Park | ....................... F21V 17/107 |
| | | | | 362/85 |

(Continued)

FOREIGN PATENT DOCUMENTS

| CN | 201252258 | 6/2009 |
| CN | 201515061 | 6/2010 |

(Continued)

OTHER PUBLICATIONS

Ford Global Technologies LLC, "Positioning System For An Optical Lens", Oct. 30, 2014, DE-202014104049-U1, pp. 1-11 ( Year: 2014).*

(Continued)

*Primary Examiner* — Alan B Cariaso
(74) *Attorney, Agent, or Firm* — JCIPRNET

(57) ABSTRACT

A housing structure including a first housing and a second housing is provided. The first housing includes a first body and at least one metal fixing part protruding from the first body. The second housing includes a second body and at least one receiving part. The at least one metal fixing part leans against the at least one receiving part in a bent manner, such that the first housing is fixed on the second housing.

17 Claims, 14 Drawing Sheets

(51) Int. Cl.
*F21S 45/10* (2018.01)
*F21V 15/01* (2006.01)
*F21V 17/10* (2006.01)

(58) Field of Classification Search
USPC .......................................................... 362/374
See application file for complete search history.

(56) References Cited

U.S. PATENT DOCUMENTS

| | | | | |
|---|---|---|---|---|
| 5,205,633 | A | * | 4/1993 | Kasboske ............ B60Q 1/0483 362/519 |
| 5,865,532 | A | * | 2/1999 | Bonazzi .................. F21V 17/20 362/455 |
| 2019/0033613 | A1 | | 1/2019 | Takimoto et al. |

FOREIGN PATENT DOCUMENTS

| | | | | |
|---|---|---|---|---|
| CN | 102195155 | | 9/2011 | |
| CN | 103363468 | | 10/2013 | |
| CN | 203442630 | U * | 2/2014 | ............... F21K 9/27 |
| CN | 204315807 | | 5/2015 | |
| CN | 109995969 | | 7/2019 | |
| CN | 110769136 | | 2/2020 | |
| DE | 202011003418 | * | 7/2021 | ............... F21K 9/50 |
| EP | 3669695 | | 6/2020 | |
| JP | 2016080936 | | 5/2016 | |

OTHER PUBLICATIONS

"Office Action of China Counterpart Application", dated Dec. 5, 2023, p. 1-p. 8.

* cited by examiner

HOUSING STRUCTURE

CROSS-REFERENCE TO RELATED APPLICATION

This application claims the priority benefit of U.S. provisional application Ser. No. 63/092,515, filed on Oct. 16, 2020, and China application serial no. 202111006021.0, filed on Aug. 30, 2021. The entirety of each of the above-mentioned patent applications is hereby incorporated by reference herein and made a part of this specification.

BACKGROUND

Technical Field

The disclosure relates to a housing structure. Particularly, the disclosure relates to a housing structure in which two housings may be easily fixed.

Description of Related Art

Currently, a housing structure of a lens module may be formed by combining upper and lower housings. A lens is fixed between the two housings, and the two housings are locked by screws. However, since locking by screws is required, a screw hole base is required to be disposed in the housing. In addition, since the housings may require a certain thickness to form the screw hole base, the internal space of the housing structure is limited. Moreover, under a temperature difference between cold and hot temperatures or under long-term use, screw loosening is also likely to occur, which reduces the fixation between the two housings.

SUMMARY

The disclosure is directed to a housing structure, in which two housings are combined in a particular manner, an internal space is not affected, and stability is good.

According to an embodiment of the disclosure, a housing structure includes a first housing and a second housing. The first housing includes a first body and at least one metal fixing part protruding from the first body. The second housing includes a second body and at least one receiving part. The at least one metal fixing part leans against the at least one receiving part in a bent manner, such that the first housing is fixed on the second housing.

In the housing structure according to an embodiment of the disclosure, the at least one metal fixing part is insert-molded in the first body.

In the housing structure according to an embodiment of the disclosure, the at least one metal fixing part and the first body have a same material and are integrally formed.

In the housing structure according to an embodiment of the disclosure, the first housing further includes an extension element extending from the first body. The at least one metal fixing part is connected to the extension element in a bent manner.

In the housing structure according to an embodiment of the disclosure, the at least one metal fixing part includes two metal fixing parts. The two metal fixing parts are connected to opposite sides of the extension element.

In the housing structure according to an embodiment of the disclosure, the extension element and the two metal fixing parts form a T-shaped structure.

In the housing structure according to an embodiment of the disclosure, each of the metal fixing part includes a connecting end and a movable end that are opposite to each other. The movable end is away from the extension element. A gap is present between the movable end and the first body. A thickness of the receiving part is equal to or smaller than the gap.

In the housing structure according to an embodiment of the disclosure, the receiving part includes a groove recessed from the second body, an abutment surface located beside the groove, and a bottom surface. The metal fixing part is located in the groove. The bottom surface is between the metal fixing part and the first body. The metal fixing part leans against the abutment surface of the receiving part.

In the housing structure according to an embodiment of the disclosure, the metal fixing part has a bottom facing the bottom surface, and one of the bottom and the bottom surface is inclined.

In the housing structure according to an embodiment of the disclosure, the bottom surface is inclined in a direction away from the abutment surface.

In the housing structure according to an embodiment of the disclosure, a height difference of the bottom surface is between 0.05 mm and 0.15 mm.

In the housing structure according to an embodiment of the disclosure, the metal fixing part includes a connecting end and a movable end that are opposite to each other. A width of the connecting end is greater than a width of the movable end, such that the bottom is inclined.

In the housing structure according to an embodiment of the disclosure, the groove is a trapezoidal groove, a rectangular groove, or a triangular groove.

In the housing structure according to an embodiment of the disclosure, a width of the groove is equal to or greater than a length of the metal fixing part.

In the housing structure according to an embodiment of the disclosure, a length of the abutment surface is equal to or greater than a length of the metal fixing part.

In the housing structure according to an embodiment of the disclosure, a width of the metal fixing part is less than or equal to a depth of the groove.

In the housing structure according to an embodiment of the disclosure, an included angle between the metal fixing part and the extension element is between 90 degrees and 150 degrees.

In the housing structure according to an embodiment of the disclosure, a thickness of the second body is greater than a thickness of the receiving part.

In the housing structure according to an embodiment of the disclosure, the receiving part includes a groove recessed from the second body and a recess. The metal fixing part extends into the groove after abutting the recess of the second housing. A depth of the recess is less than a depth of the groove.

In the housing structure according to an embodiment of the disclosure, the metal fixing part includes a first portion, a second portion, and a third portion that are connected in a bent manner. The first portion abuts the recess of the second housing. The second portion and the third portion abut a portion of the receiving part between the recess and the groove.

In the housing structure of the disclosure, the first housing includes the at least one metal fixing part protruding from the first body, and the second housing includes the at least one receiving part of the second body. The first housing is fixed on the second housing through the at least one metal fixing part leaning against the at least one receiving part in a bent manner between the first housing and the second housing. Compared with the conventional structure where the two housings are fixed by screw-locking, since the housing structure of the disclosure requires no screws for fixing, the design of the screw hole base may be omitted, increasing the internal space available. In addition, in the housing structure of the disclosure, with the property that metal has an increased strength after being bent, the metal fixing part after being bent can stably lean against the receiving part to maintain the fixation between them.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
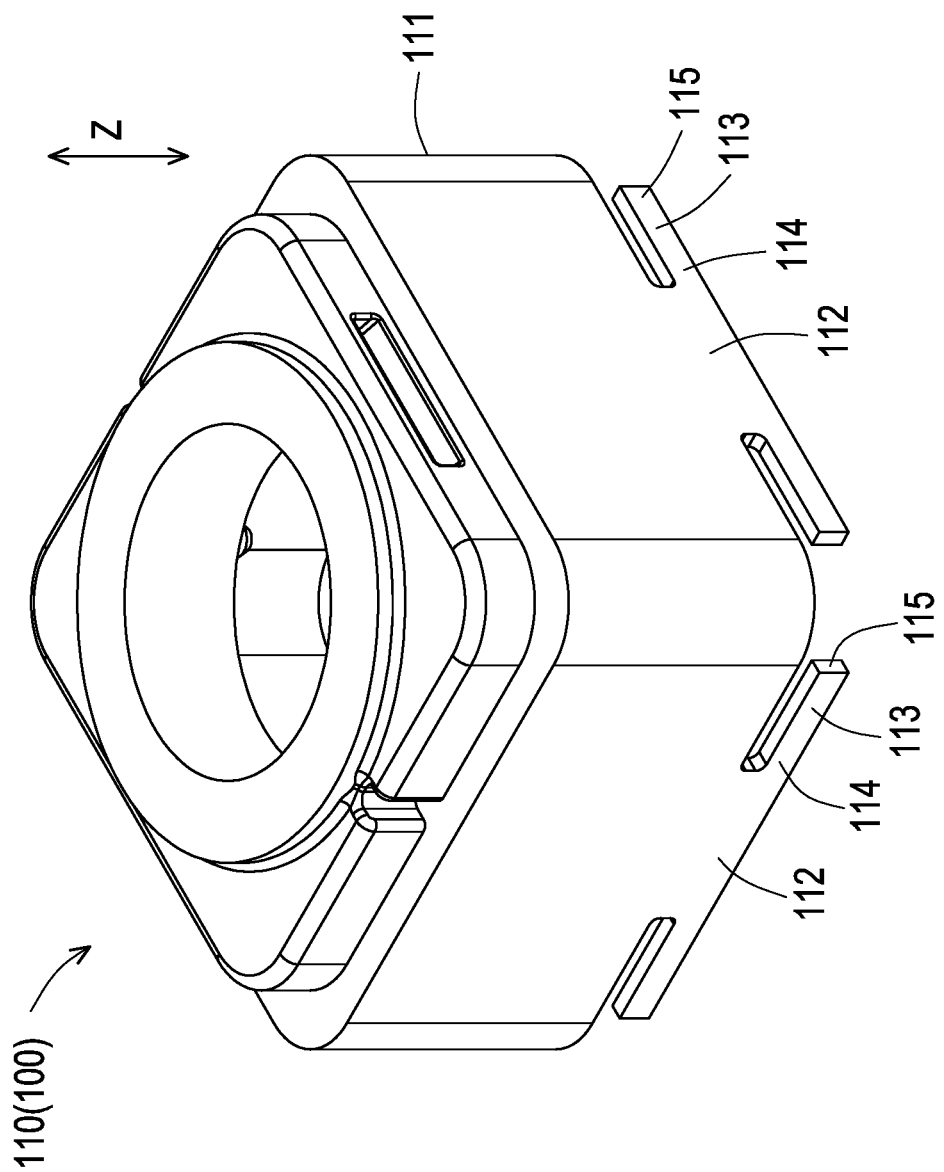
FIG. 1 is a schematic view of an unassembled first housing of a housing structure according to an embodiment of the disclosure.

Reference will now be made in detail to exemplary embodiments of the disclosure, examples of which are illustrated in the accompanying drawings. Wherever possible, the same reference numerals are used in the drawings and description to denote the same or similar parts.

Figure 2:
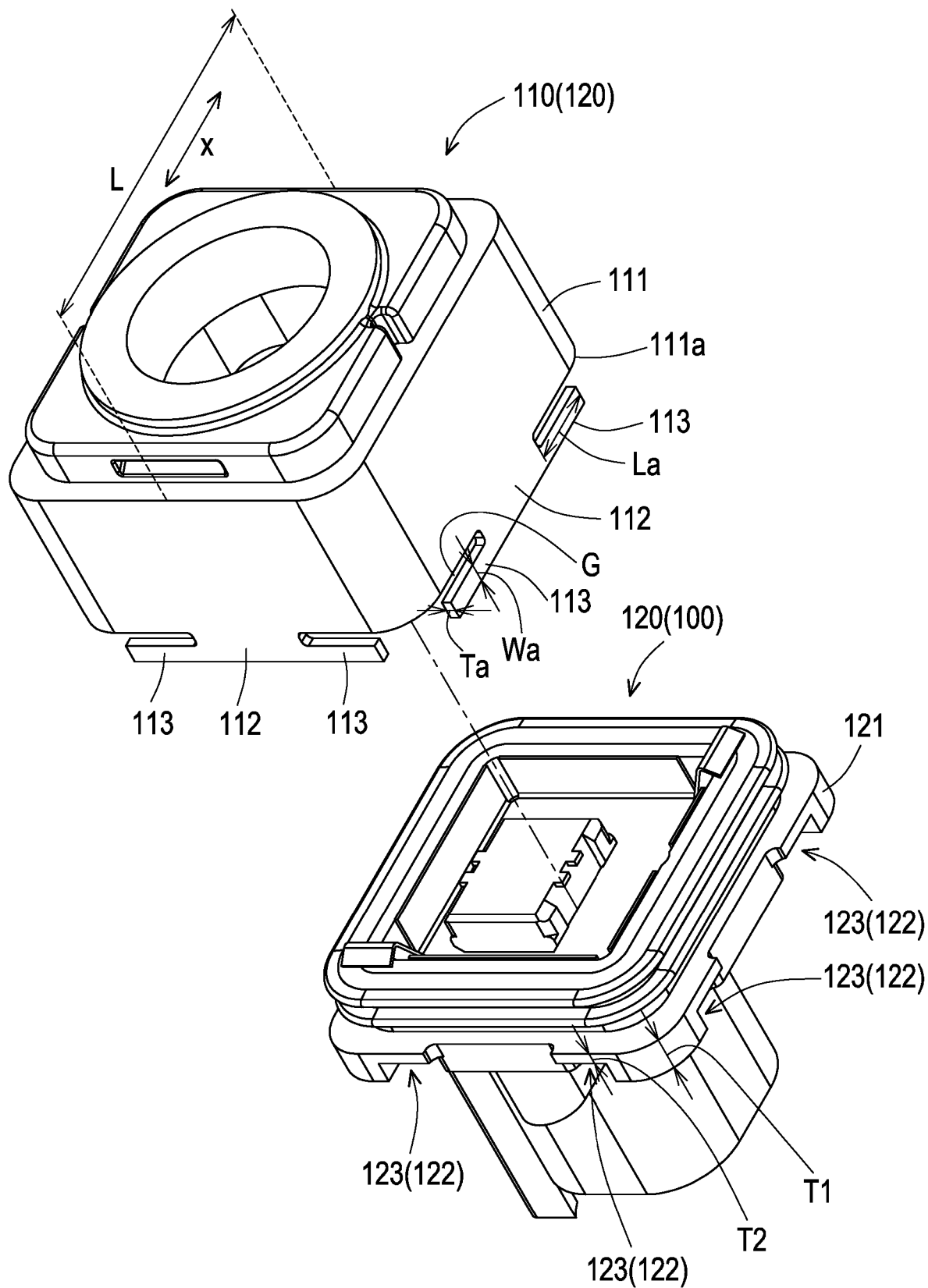
FIG. 2 is an exploded view of the first housing and a second housing of the housing structure of FIG. 1.
Figure 3:
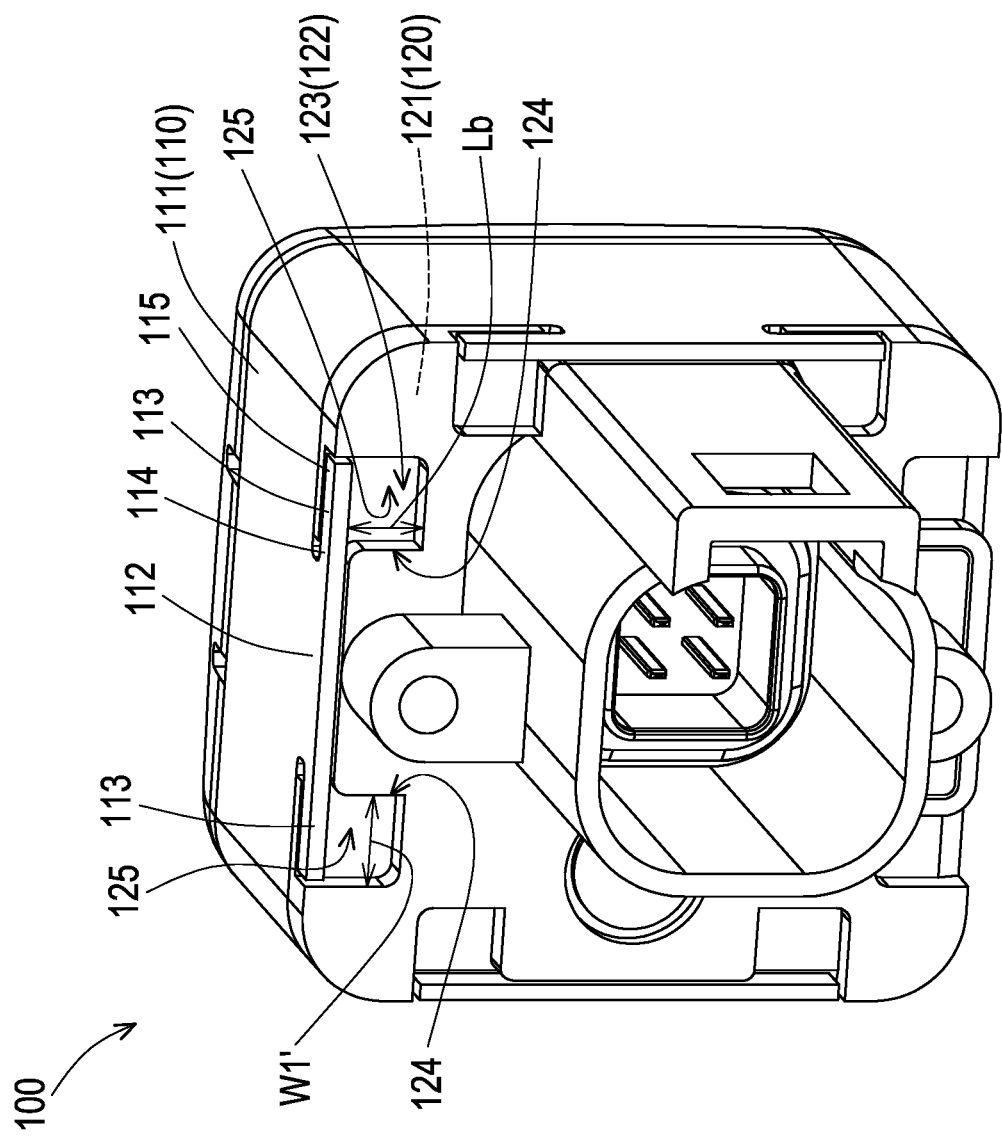
FIG. 3 is a schematic view showing the first housing of the housing structure of FIG. 1 disposed on the second housing with an unbent metal fixing part.
Figure 4:
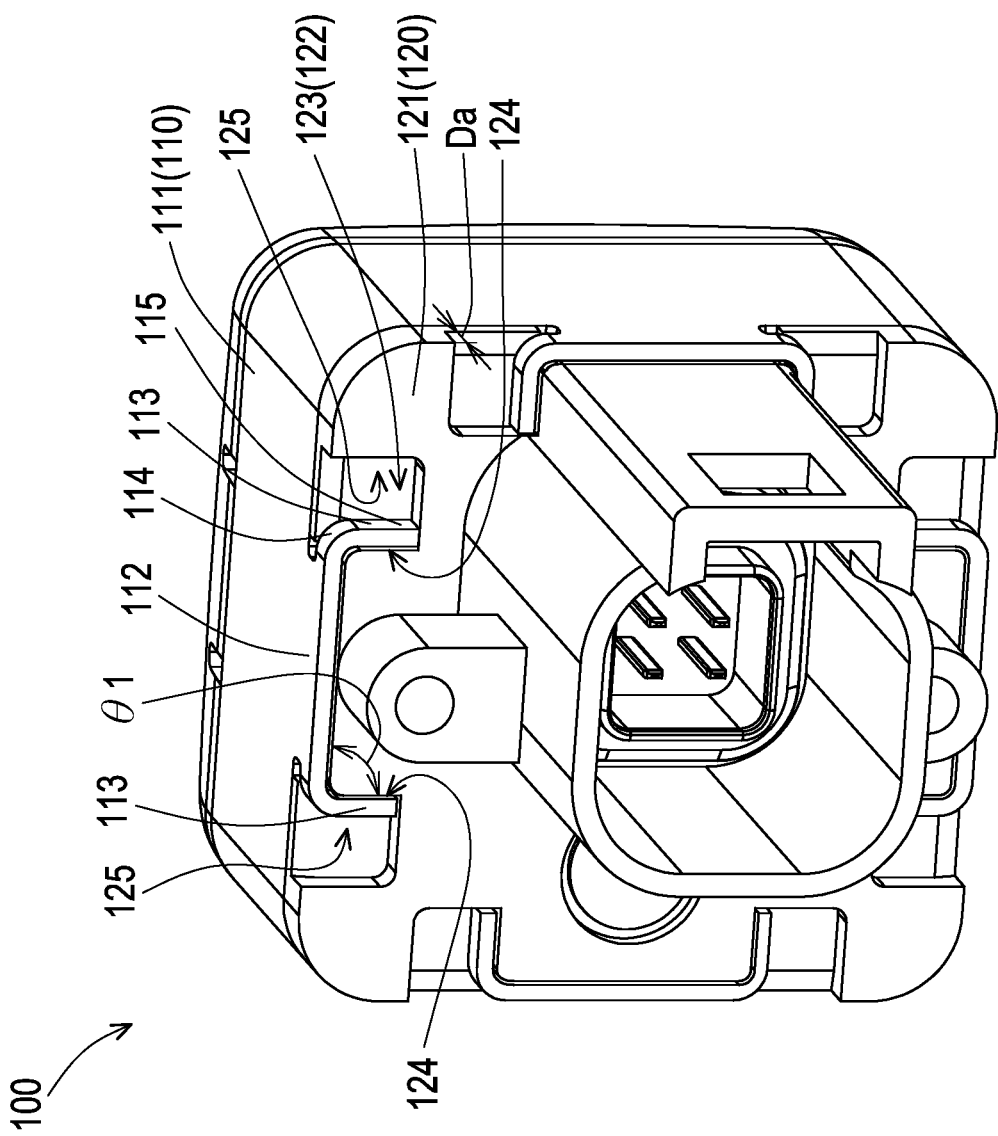
FIG. 4 is a schematic view of FIG. 3 with the bent metal fixing part.

FIG. 1 is a schematic view of an unassembled first housing of a housing structure according to an embodiment of the disclosure. FIG. 2 is an exploded view of the first housing and a second housing of the housing structure of FIG. 1. FIG. 3 is a schematic view showing the first housing of the housing structure of FIG. 1 disposed on the second housing with an unbent metal fixing part. FIG. 4 is a schematic view of FIG. 3 with the bent metal fixing part.

With reference to FIG. 1 to FIG. 4, a housing structure 100 of this embodiment includes a first housing 110 and a second housing 120 (FIG. 2). In this embodiment, the first housing 110 is, for example, an upper housing of a lens module for a vehicle, and the second housing 120 is, for example, a lower housing of the lens module for a vehicle, but the application type of the housing structure 100 is not limited thereto. A thickness direction of the first housing 110 is a first direction Z.

The first housing 110 includes a first body 111 and at least one metal fixing part 113 protruding from the first body 111. In this embodiment, the material of the first body 111 is metal, and the metal fixing part 113 and the first body 111 are made of same material and are integrally formed.

It can be seen from FIG. 2 that, in this embodiment, the first housing 110 also includes an extension element 112 extending from the first body 111. The at least one metal fixing part 113 corresponding to the extension element 112 includes, for example, two metal fixing parts. The two metal fixing parts 113 are connected to opposite sides of the extension element 112. The two metal fixing parts 113 are symmetrically arranged based on the extension element 112, and extend in a second direction X perpendicular to the first direction Z. The metal fixing part 113 has a length La, a width Wa, and a thickness Ta. In other words, the extension element 112 and the two metal fixing parts 113 form a set of T-shaped structure. In this embodiment, the first body 111 is a rectangular body with a side length of L, and the first body 111 has a bonding surface 111a bonded to the second housing 120. The housing structure 100 has four sets of T-shaped structures extending from the bonding surfaces 111a on four sides of the first body 111. The length La of the metal fixing part 113 is about 0.3 to 0.4 times the side length L of the first body 111. In addition, it can be seen from FIG. 1 that each metal fixing part 113 includes a connecting end 114 and a movable end 115 opposite to each other. The connecting end 114 is connected to the extension element 112. The movable end 115 is connected to the connecting end 114, and the movable end 115 is away from the extension element 112. Moreover, a gap G is present between the movable end 115 and the first body 111 (FIG. 2).

It can be seen from FIG. 3 that the second housing 120 includes a second body 121 and at least one receiving part 122 recessed from the second body 121. It can be seen from FIG. 2 that a thickness of the second body 121 is T1, and a thickness of the receiving part 122 is T2, where the thickness T2 is less than the thickness T1. In this embodiment, the receiving part 122 includes a groove 123 and an abutment surface 124 located beside the groove 123. A depth of the groove 123 in the first direction is Da (FIG. 4). The groove 123 is, for example, a rectangular groove, but the shape of the groove 123 is not limited thereto. In this embodiment, the second housing 120 has eight receiving parts 122 in total, and the number of receiving parts 122 corresponds to the number of metal fixing parts 113. Moreover, the thickness T2 (FIG. 2) of the receiving part 122 of the second body 121 is equal to or slightly smaller than the gap G (FIG. 2).

When the first housing 110 and the second housing 120 are to be fixed, it can be seen from FIG. 3 to FIG. 4 that the first housing 110 and the second housing 120 are fixed in a jig and applied with pressure by a device to bend the metal fixing part 113 toward the center of the second housing 120 to a position where the metal fixing part 113 leans against the abutment surface 124 of the corresponding receiving part 122. Thus, the metal fixing part 113 is bent from the connecting end 114 and leans against the abutment surface 124 of the corresponding receiving part 122. A width W1' (FIG. 3) of the groove 123 is equal to or slightly greater than the bending length La (FIG. 2) of the metal fixing part 113, and a length Lb (FIG. 3) of the abutment surface 124 is also equal to or slightly greater than the length La of the metal fixing part 113. The width Wa (FIG. 2) of the metal fixing part 113 is less than or equal to Da (FIG. 4), and may also be designed to be greater than Da depending on actual requirements, convenient for the receiving part 122 to receive the metal fixing part 113. After the metal fixing part 113 is bent, the movable end 115 is closer to the center of the second housing 120 than the connecting end 114.

Since the bent metal has a greater strength, the metal fixing part 113 can be well maintained in the receiving part 122 and lean against the abutment surface 124 of the receiving part 122 to fix the first housing 110 on the second housing 120.

In addition, it can be seen from FIG. 4 that the eight bent metal fixing parts 113 can abut the second body 121 in different directions to maintain a stable connection between the second housing 120 and the first housing 110. In other embodiments, the numbers of and the relative position between the metal fixing part 113 and the receiving part 122 are not limited thereto.

As shown in FIG. 4, in this embodiment, an included angle θ1 between the metal fixing part 113 and the extension element 112 is between 90 degrees and 150 degrees. Specifically, the included angle θ1 between the metal fixing part 113 and the extension element 112 is, for example but not limited to, 90 degrees.

Compared with the conventional structure where the two housings are fixed by screw-locking, since the housing structure 100 of this embodiment requires no screws for fixing, the design of screw holes may be omitted, increasing the internal space available. Alternatively, the overall volume of the housing structure 100 may be reduced.

Figure 5:
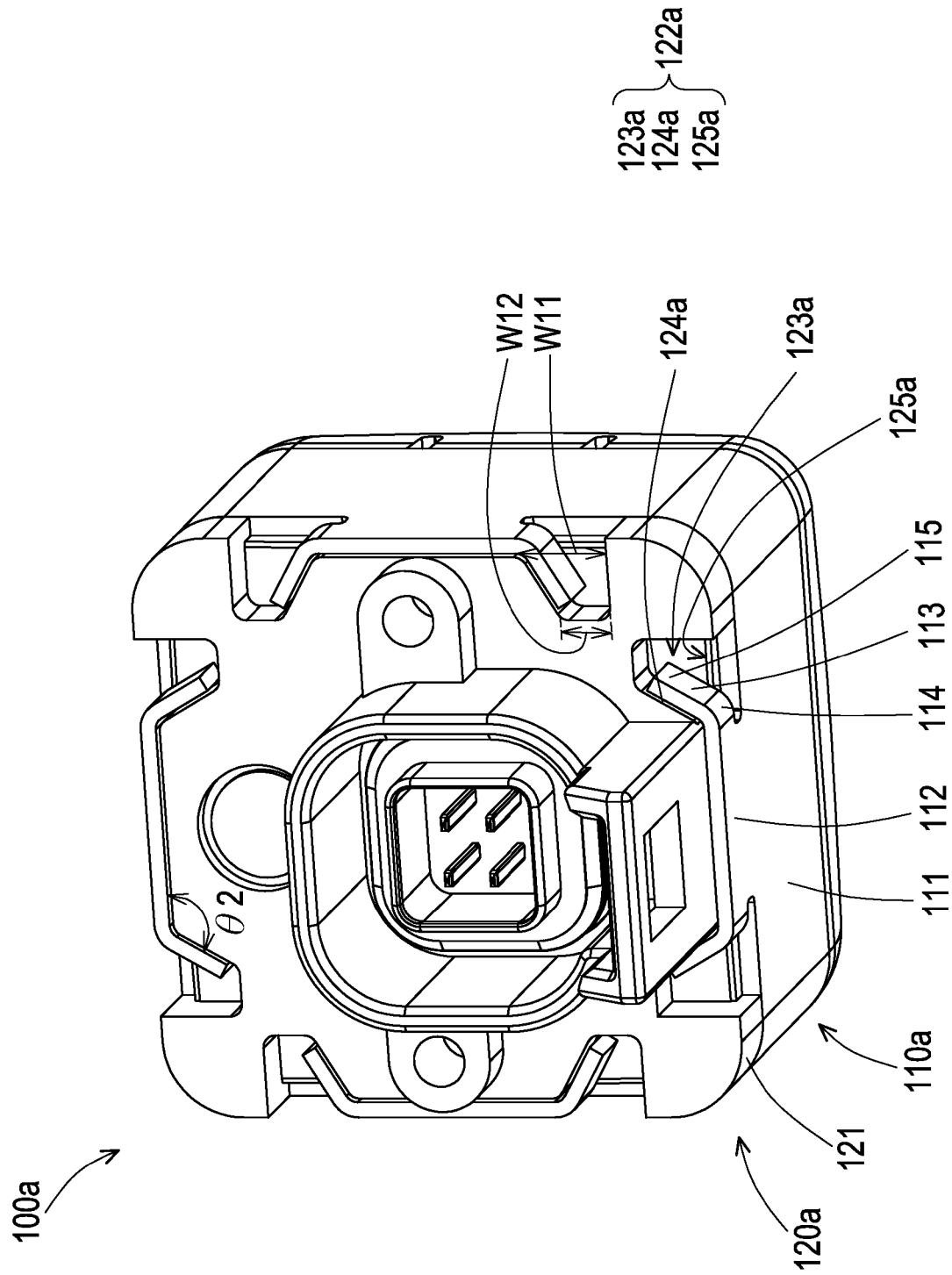
FIG. 5 is a schematic view of a housing structure according to another embodiment of the disclosure.
Figure 6:
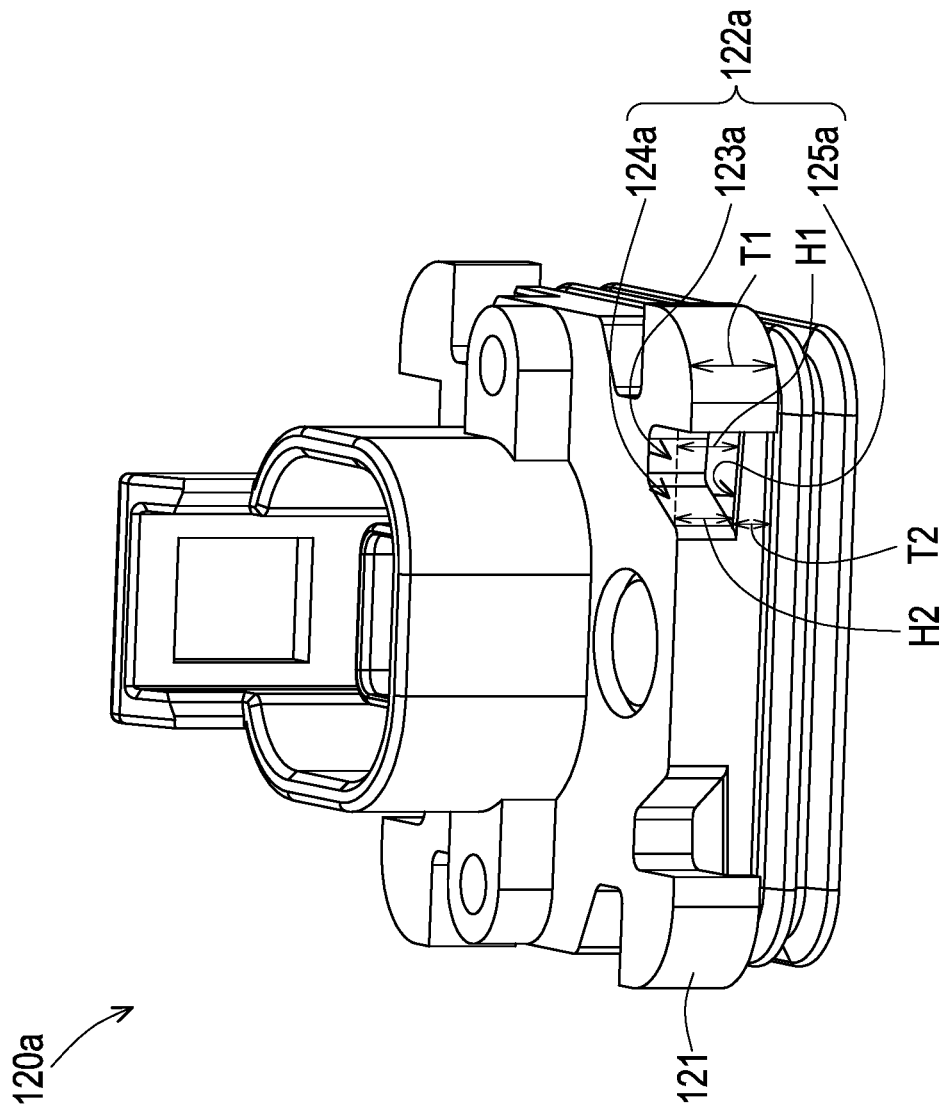
FIG. 6 is a schematic view of a second housing of the housing structure of FIG. 5.
Figure 7:
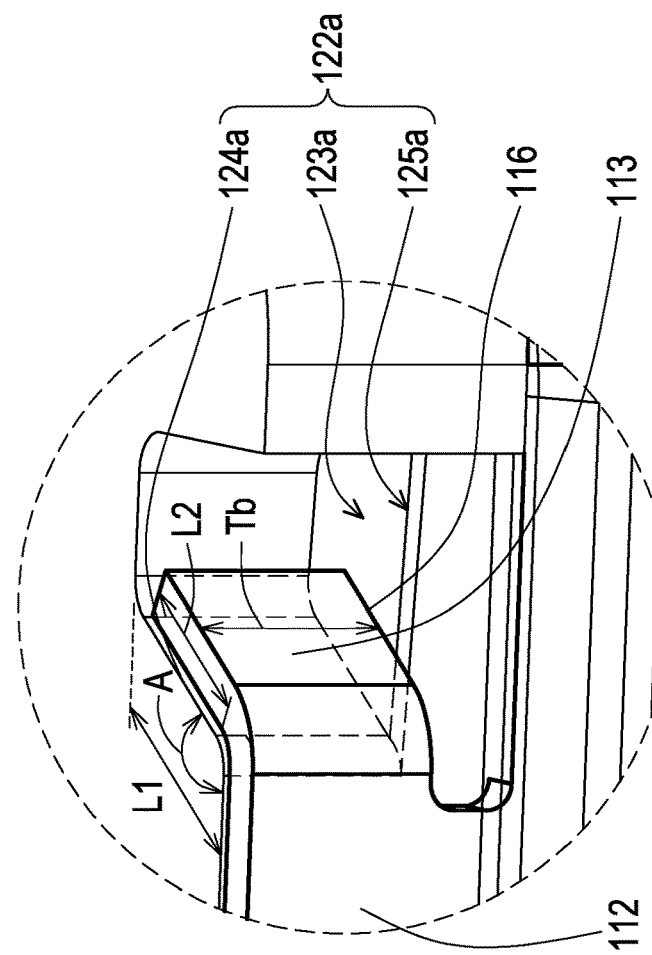
FIG. 7 is a partially enlarged schematic view of the housing structure of FIG. 5 from another perspective.

FIG. 5 is a schematic view of a housing structure according to another embodiment of the disclosure. FIG. 6 is a schematic view of a second housing of the housing structure of FIG. 5. FIG. 7 is a partially enlarged schematic view of the housing structure of FIG. 5 from another perspective.

With reference to FIG. 5 to FIG. 7, the main difference between a housing structure 100a of this embodiment and the housing structure 100 of the previous embodiment lies in that, in this embodiment, a groove 123a is a trapezoidal groove, and a width W11 of the opening of the groove 123a is greater than a width W12 of the opening of the groove 123a (i.e., W11>W12). In other embodiments, the groove 123a may also be a rectangular groove or a triangular groove, and the shape of the groove 123a is not limited thereto. Due to the change in the shape of the groove 123a, an included angle θ2 (FIG. 5) between the metal fixing part 113 and the extension element 112 is also changed accordingly. The included angle θ2 is, for example but not limited to, 135 degrees.

Similarly, since the bent metal has a greater strength, the metal fixing part 113 can be well maintained in a receiving part 122a and leans against an abutment surface 124a of the receiving part 122a. A length L1 (FIG. 7) of the abutment surface 124a is greater than or equal to a length L2 (FIG. 7) of the metal fixing part 113. In this embodiment, the bent metal fixing parts 113 can abut the second body 121 in different directions to maintain a stable connection between a second housing 120a and a first housing 110a. The width W11 (FIG. 5) of the groove 123a is equal to or slightly greater than the bending length L2 (FIG. 7) of the metal fixing part 113, and the length L1 of the abutment surface 124a is also equal to or slightly greater than the length L2 of the metal fixing part 113. A width Tb (FIG. 7) of the metal fixing part 113 is less than or equal to a height H2 (FIG. 6), convenient for the receiving part 122a to receive the metal fixing part 113. After metal fixing part 113 is bent, the movable end 115 is closer to the center of the second housing 120a than the connecting end 114.

In addition, in this embodiment, the receiving part 122a includes a bottom surface 125a. The first body 111 is located under the bottom surface 125a of FIG. 5. The metal fixing part 113 is located in the groove 123a and above the bottom surface 125a of FIG. 5. In other words, the bottom surface 125a is between the corresponding metal fixing part 113 and the first body 111.

It can be seen from FIG. 7 that the metal fixing part 113 has a bottom 116 facing the bottom surface 125a. Either the bottom 116 or the bottom surface 125a is inclined. Specifically, in this embodiment, the bottom surface 125a is inclined in a direction away from the abutment surface 124a (i.e., toward the right of FIG. 7). As shown in FIG. 6, a height difference (a difference between a height H1 and the height H2, where H1>H2) of the receiving part 122a is between 0.05 mm and 0.15 mm, for example, 0.1 mm. The width Tb of the metal fixing part 113 is less than or equal to the height H2, and the height H2 is less than the height H1. An angle A (FIG. 7) is between 90 degrees and 150 degrees. Nonetheless, the disclosure is not limited thereto.

In such an inclined design, the metal fixing part 113, during the bending process, passes through the lower part of the bottom surface 125a of the groove 123a (the right side of the groove 123a in FIG. 7), and is then bent toward the higher part of the bottom surface 125a of the groove 123a (the left side of the groove 123a in FIG. 7), resulting in interference with the bottom 116 of the metal fixing part 113. In other words, a friction is formed between the bottom 116 of the metal fixing part 113 and the bottom surface 125a of the groove 123a at a portion close to the abutment surface 124a, to fix the metal fixing part 113 more closely on the receiving part 122a.

Figure 8:
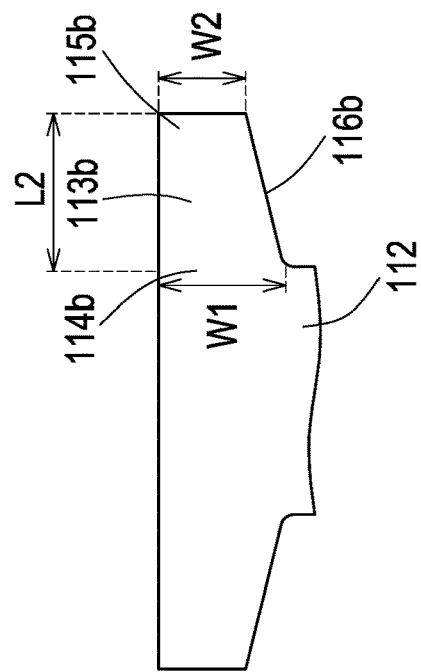
FIG. 8 is a schematic view showing an unbent metal fixing part according to another embodiment of the disclosure.

FIG. 8 is a schematic view showing an unbent metal fixing part according to another embodiment of the disclosure. With reference to FIG. 8, a metal fixing part 113b includes a connecting end 114b and a movable end 115b that are opposite to each other. The connecting end 114b is connected to the extension element 112, and the movable end 115b is away from the extension element 112. In this embodiment, a width W1 of the connecting end 114b is greater than a width W2 of the movable end 115b, such that a bottom 116b of the metal fixing part 113b is inclined. Therefore, in this embodiment, the groove 123 (FIG. 3) corresponding to the metal fixing part 113b may have a bottom surface 125 (FIG. 3) which is a non-inclined plane.

In this embodiment, since the width W1 of the connecting end 114b is greater, the bottom 116b of the metal fixing part 113b is lower (closer to the bottom surface 125) at the connecting end 114b than at the movable end 115b. Therefore, the friction between the bottom 116b of the metal fixing part 113b and the bottom surface 125 of the groove 123 is mainly provided by the connecting end 114b and the bottom surface 125 of the groove 123. Since the connecting end 114b is connected to the extension element 112, the connecting end 114b has greater structural strength than the movable end 115b. Therefore, the connecting end 114b designed with a greater width allows the metal fixing part 113b to be fixed more stably on the receiving part 122 (FIG. 3).

Figure 9:
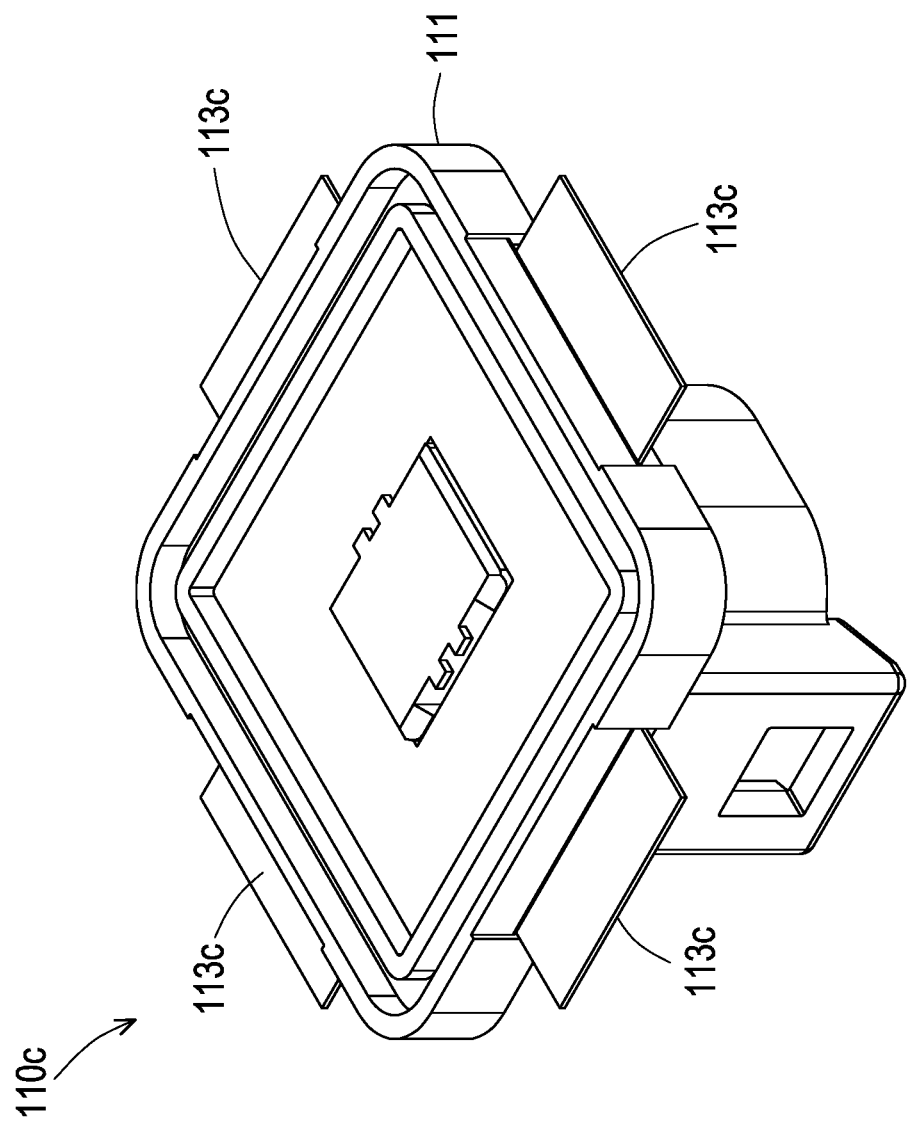
FIG. 9 is a schematic view of an unassembled first housing of a housing structure according to another embodiment of the disclosure.
Figure 10:
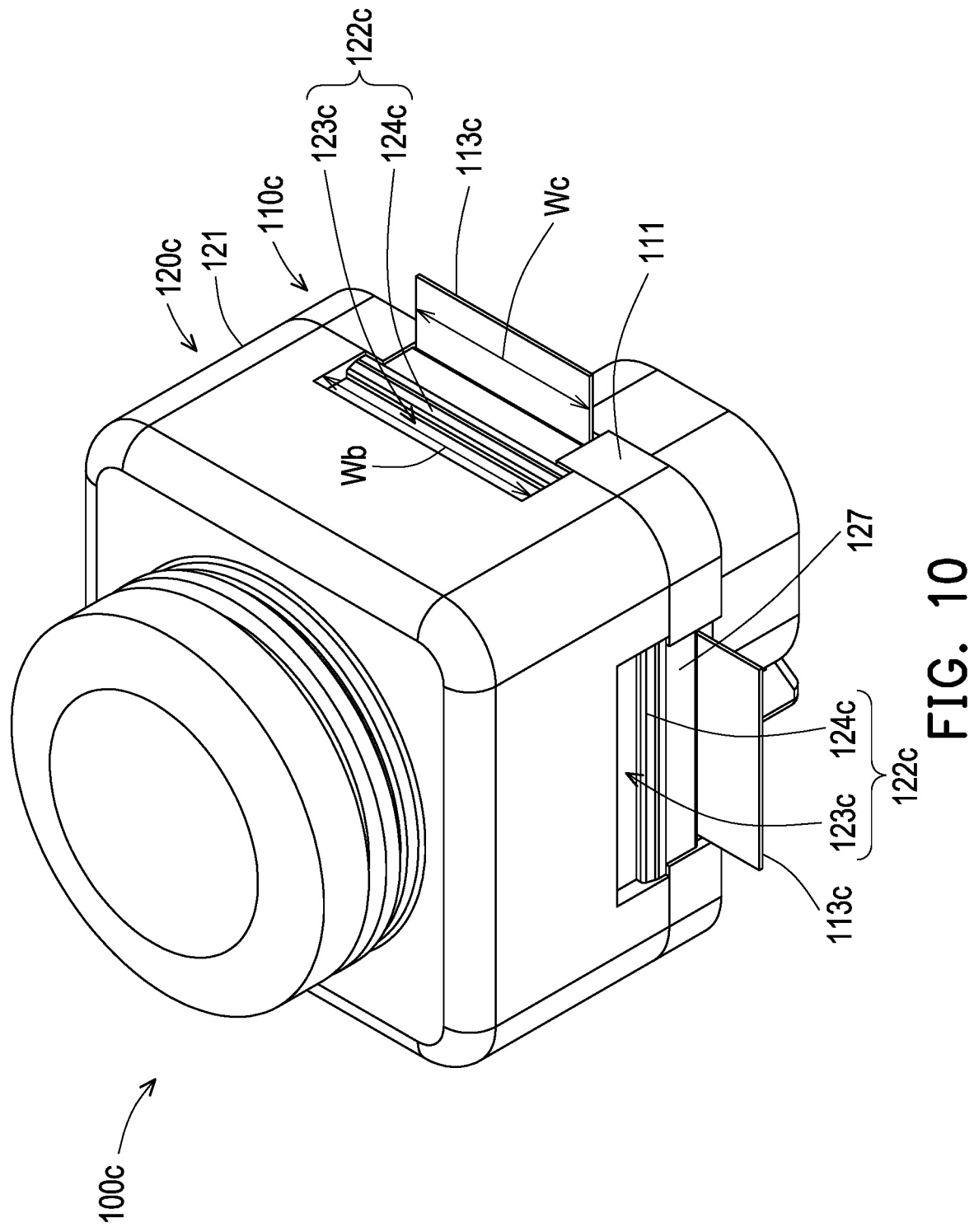
FIG. 10 is a schematic view showing the first housing of the housing structure of FIG. 9 disposed on a second housing with an unbent metal fixing part.
Figure 11:
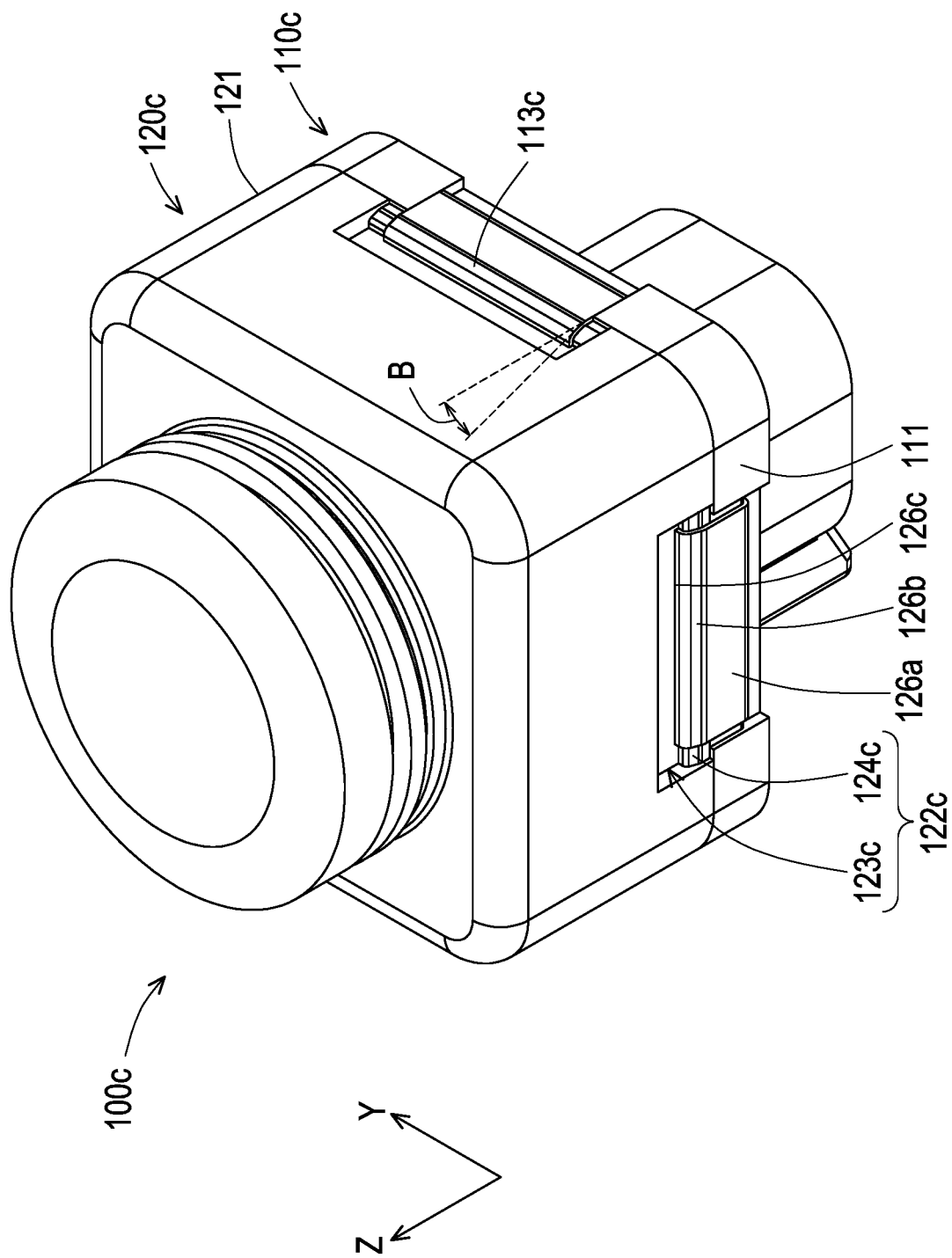
FIG. 11 is a schematic view of the appearance of the housing structure of FIG. 10 with the bent metal fixing part.
Figure 12:
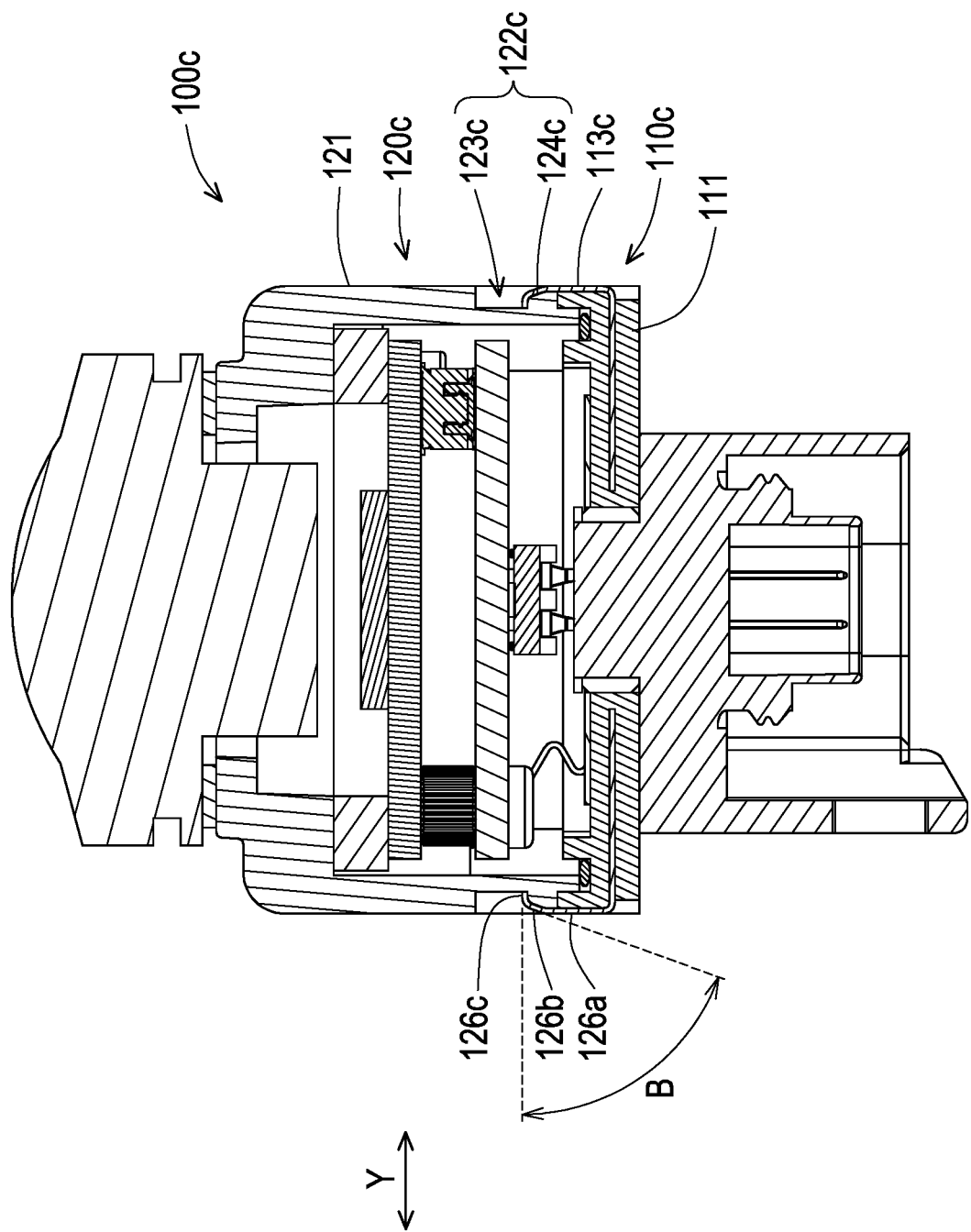
FIG. 12 is a schematic cross-sectional view of the housing structure of FIG. 11.

FIG. 9 is a schematic view of an unassembled first housing of a housing structure according to another embodiment of the disclosure. FIG. 10 is a schematic view showing the first housing of the housing structure of FIG. 9 disposed on a second housing with an unbent metal fixing part. FIG. 11 is a schematic view of the appearance of the housing structure of FIG. 10 with the bent metal fixing part. FIG. 12 is a schematic cross-sectional view of the housing structure of FIG. 11.

With reference to FIG. 9 to FIG. 12, in a housing structure 100c of this embodiment, a first housing 110c is, for example, a lower housing of a lens module, and a second housing 120c (FIG. 10) is, for example, an upper housing of the lens module. The types of the first housing 110c and the second housing 120c are not limited thereto.

In this embodiment, the material of the first body 111 is plastic, for example. It can be seen from FIG. 12 that a metal fixing part 113c is insert-molded in the first body 111. In addition, the metal fixing part 113c may have a rectangular shape, and may include four metal fixing parts. The second housing 120c has a rectangular shape, and has the second body 121 with four receiving parts 122c on four sides. As shown in FIG. 11, the four metal fixing parts 113c are fixed on the four receiving parts 122c of the second housing 120c in a bent manner, but the shape and number of the metal fixing part 113c are not limited thereto.

Similarly, in this embodiment, as shown in FIG. 10 to FIG. 12, since the metal fixing part 113c has an increased strength after being bent, when the first housing 110e and the second housing 120c are to be fixed, it is only required that the metal fixing part 113c bends to lean against an abutment surface 124c of the receiving part 122c corresponding to the second housing 120c and extend into a groove 123c. A width Wb of the groove 123c is equal to or slightly greater than a width Wc of the metal fixing part 113c, convenient for the groove 123c to receive the metal fixing part 113c. After the metal fixing part 113c is bent, a first portion 126a of the metal fixing part 113c abuts a recess 127 of the second housing 120c and then extends into the groove 123c. The depth of the recess 127 (FIG. 10) is less than the depth of the groove 123c. A second portion 126b and a third portion 126c of the metal fixing part 113c extend toward the center of the first body 111 and is fastened on the receiving part 122c. The first portion 126a is approximately parallel to the first direction Z. An angle B (FIG. 12) is formed between the second portion 126b and a third direction Y perpendicular to the first direction Z, and the angle B has a range of about 60 degrees. The third portion 126c is approximately perpendicular to the first direction Z, and the third portion 126c leans against the abutment surface 124c of the receiving part 122c corresponding to the second housing 120c and extends into the groove 123c. The thickness of the metal fixing part 113c is approximately equal to or less than the depth of the recess 127, and the width of the metal fixing part 113c is approximately equal to or less than the width of the recess 127.

Figure 13:
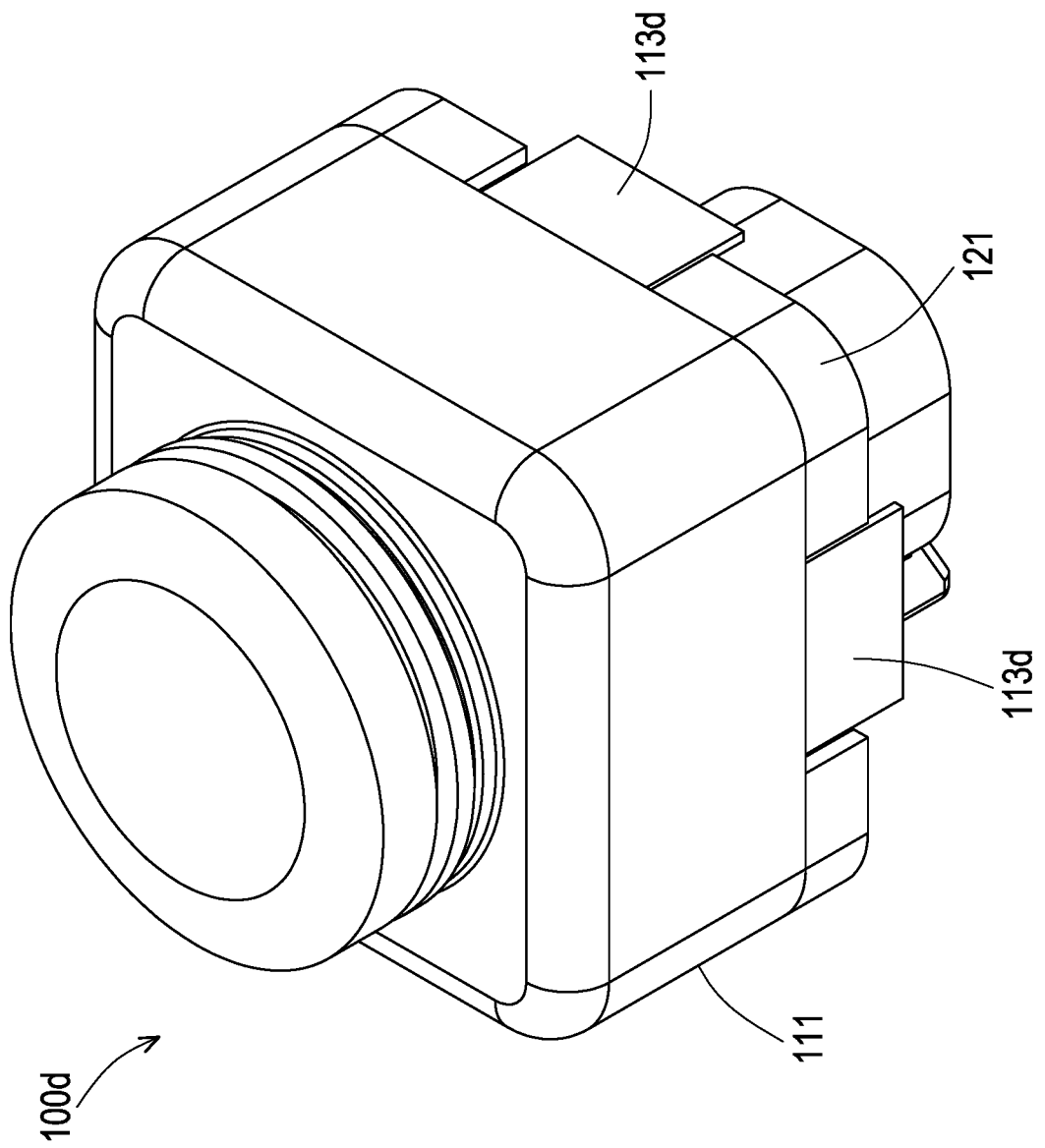
FIG. 13 is a schematic view showing a housing structure according to another embodiment of the disclosure with an unbent metal fixing part.
Figure 14:
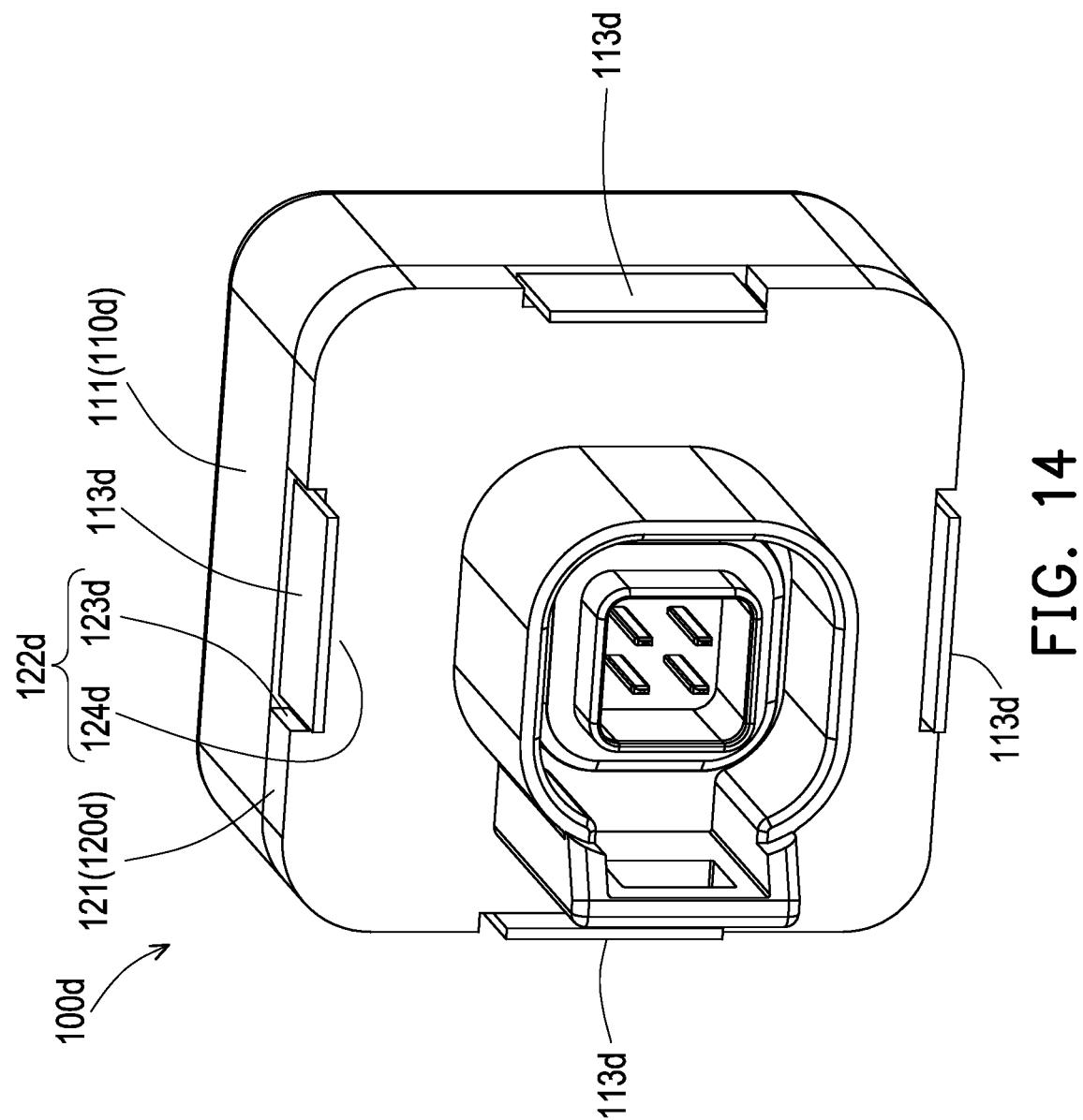
FIG. 14 is a schematic view of FIG. 13 from another perspective.
Figure 15:
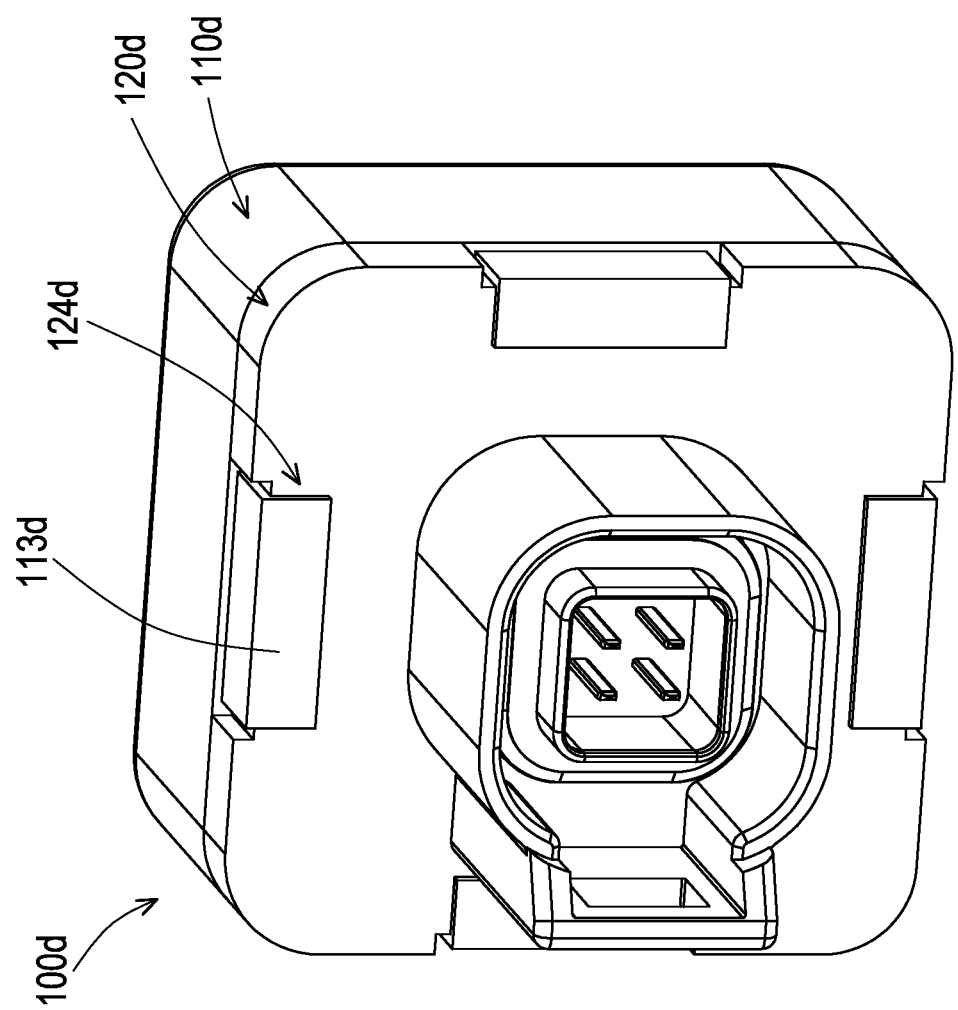
FIG. 15 is a schematic view of the housing structure of FIG. 14 with the bent metal fixing part.

FIG. 13 is a schematic view showing a housing structure according to another embodiment of the disclosure with an unbent metal fixing part. FIG. 14 is a schematic view of FIG. 13 from another perspective. FIG. 15 is a schematic view of the housing structure of FIG. 14 with the bent metal fixing part.

With reference to FIG. 13 to FIG. 15, in a housing structure 100d of this embodiment, a first housing 110d (FIG. 14) is, for example, an upper housing of a lens module, and a second housing 120d (FIG. 14) is, for example, a lower housing of the lens module. Moreover, a metal fixing part 113d is insert-molded in the first body 111.

In addition, a receiving part 122d of the second housing 120d includes, for example, a groove 123d and an abutment surface 124d (a lower surface) of the second housing 120d. Similarly, when the first housing 110 and the second housing 120d are to be fixed, it is only required that the metal fixing part 113d extends into groove 123d and bends to lean against the abutment surface 124d (the lower surface) of the second housing 120d.

In the housing structure of the disclosure, the first housing includes the at least one metal fixing part protruding from the first body, and the second housing includes the at least one receiving part of the second body. The first housing is fixed on the second housing through the at least one metal fixing part leaning against the at least one receiving part in a bent manner between the first housing and the second housing. Compared with the conventional structure where the two housings are fixed by screw-locking, since the housing structure of the disclosure requires no screws for fixing, the design of the screw hole base may be omitted, increasing the internal space available. In addition, in the housing structure of the disclosure, since the metal strength is increased after bending, the bending metal fixing part can stably lean against the receiving part to maintain the fixation therebetween.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A housing structure, comprising:
   a first housing, comprising a first body and at least one metal fixing part protruding from the first body; and
   a second housing, comprising a second body and at least one receiving part, wherein the at least one metal fixing part leans against the at least one receiving part in a bent manner, such that the first housing is fixed on the second housing,
   wherein the first housing further comprises an extension element extending from the first body, and the at least one metal fixing part is connected to the extension element in a bent manner,
   wherein the at least one metal fixing part comprises two metal fixing parts, and the two metal fixing parts are connected to opposite sides of the extension element and are bendable relative to the extension element at locations where the two metal fixing parts are connected to the extension element,
   wherein before the first housing is fixed on the second housing, the extension element and the two metal fixing parts are located on a same plane, and after the first housing is fixed on the second housing, the extension element and the two metal fixing parts are located on different planes.
2. The housing structure according to claim 1, wherein the at least one metal fixing part is insert-molded in the first body.

3. The housing structure according to claim 1, wherein the at least one metal fixing part and the first body are made of same material and are integrally formed.

4. The housing structure according to claim 1, wherein the extension element and the two metal fixing parts form a T-shaped structure.

5. The housing structure according to claim 1, wherein each of the metal fixing part comprises a connecting end and a movable end that are opposite to each other, the movable end is away from the extension element, a gap is present between the movable end and the first body, and a thickness of each of the at least one receiving part of the second body is equal to or smaller than the gap.

6. The housing structure according to claim 1, wherein each of the at least one receiving part comprises a groove recessed from the second body, an abutment surface located beside the groove, and a bottom surface, the metal fixing part is located in the groove, the bottom surface is between the metal fixing part and the first body, and the metal fixing part leans against the abutment surface of the receiving part.

7. The housing structure according to claim 6, wherein the metal fixing part has a bottom facing the bottom surface, and one of the bottom and the bottom surface is inclined.

8. The housing structure according to claim 7, wherein the bottom surface is inclined in a direction away from the abutment surface.

9. The housing structure according to claim 8, wherein a difference between a height of a side of the receiving part adjacent to the second body and a height of another side of the receiving part adjacent to the abutment surface is between 0.05 mm and 0.15 mm.

10. The housing structure according to claim 7, wherein the metal fixing part comprises a connecting end and a movable end that are opposite to each other, and a width of the connecting end is greater than a width of the movable end, such that the bottom is inclined.

11. The housing structure according to claim 6, wherein the groove is a trapezoidal groove, a rectangular groove, or a triangular groove.

12. The housing structure according to claim 6, wherein a width of the groove is equal to or greater than a length of the metal fixing part.

13. The housing structure according to claim 6, wherein a length of the abutment surface is equal to or greater than a length of the metal fixing part.

14. The housing structure according to claim 6, wherein a width of the metal fixing part is less than or equal to a depth of the groove.

15. The housing structure according to claim 1, wherein an included angle between the metal fixing part and the extension element is between 90 degrees and 150 degrees.

16. The housing structure according to claim 1, wherein a thickness of the second body is greater than a thickness of the receiving part.

17. The housing structure according to claim 1, wherein a thickness direction of the first housing is a first direction, and the two metal fixing parts are bent in a second direction perpendicular to the first direction.

* * * * *